Sept. 22, 1925. Re. 16,171

J. B. HENDERSON

FIRE CONTROL APPARATUS FOR NAVAL GUNS

Original Filed July 26, 1919 3 Sheets-Sheet 1

INVENTOR
James Blacklock Henderson,
BY Mosley and Gill,
ATTORNEYS

Sept. 22, 1925. Re. 16,171

J. B. HENDERSON

FIRE CONTROL APPARATUS FOR NAVAL GUNS

Original Filed July 26, 1919 3 Sheets-Sheet 2

INVENTOR.
James Blacklock Henderson,
BY Mouzley and Gill,
ATTORNEYS.

Sept. 22, 1925. Re. 16,171

J. B. HENDERSON

FIRE CONTROL APPARATUS FOR NAVAL GUNS

Original Filed July 26, 1919 3 Sheets-Sheet 3

INVENTOR.
James Blacklock Henderson,
BY Moakley and Gill,
ATTORNEYS.

Reissued Sept. 22, 1925. Re. 16,171

UNITED STATES PATENT OFFICE.

JAMES BLACKLOCK HENDERSON, OF BLACKHEATH, ENGLAND.

FIRE-CONTROL APPARATUS FOR NAVAL GUNS.

Original No. 1,464,608, dated August 14, 1923, Serial No. 313,533, filed July 26, 1919. Renewed December 19, 1922. Application for reissue filed November 14, 1924. Serial No. 750,005.

*To all whom it may concern:*

Be it known that I, Sir JAMES BLACKLOCK HENDERSON, a subject of the King of Great Britain, residing at Blackheath, in the county of Kent, England, have invented certain new and useful Improvements in and Relating to Fire-Control Apparatus for Naval Guns, of which the following is a specification.

In director firing all the guns on board ship are fired simultaneously, approximately as the deck passes through the horizontal plane during the rolling or pitching motion of the ship. According to my invention I provide electrical contacts which will automatically close the firing circuit as the deck passes through a definite inclination to the horizontal plane, and optical means of controlling the position of the electrical contacts relatively to the horizontal plane. I provide also similar contacts and similar control relative to the azimuthal bearing of the target in relation to the ship.

To carry out my invention I mount a body having considerable inertia, on gimbals on a pedestal on the deck of the ship. This body is mounted preferably in neutral equilibrium on the gimbals and in order to get the equivalent of very large inertia in small compass, I preferably employ a gyroscope. In the following description I shall therefore refer to the gyroscope as the body supported in neutral equilibrium on gimbals. The gimbal axes are preferably horizontal and vertical and the rotor axis, in its normal position is perpendicular to both. The gyroscope is enclosed in a box or casing and in order to distinguish it from the rotor casing or stator of the electric motor driving the rotor, I shall refer to the box as the outer casing and to the other as the rotor casing. The outer casing is mounted on the pedestal and is provided with a hand training gear relatively to the pedestal. The gimbal ring is suspended say on a horizontal trunnion axis on the outer casing and the rotor casing is suspended on a vertical trunnion axis in the gimbal ring.

In the accompanying drawings which illustrate my invention Figs. 1 and 2 show respectively an elevation and a plan of one arrangement of the parts of the director sight.

Figs. 7, 8, 9, and 10 show respectively a side elevation, a back elevation with the gyro removed, a sectional plan and a front elevation of the telescope of an arrangement which permits the observer to face the target and which has optical compensation for the tilting of the gyro axis.

Figure 11:
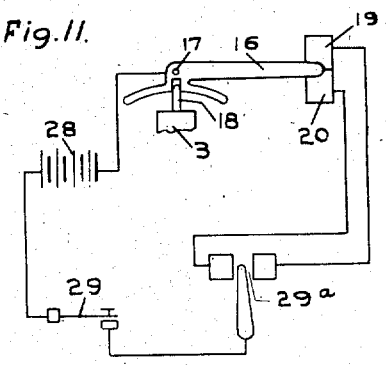
Figure 12:
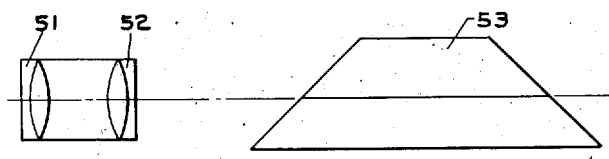

Fig. 11 shows a diagram of connections.

Figs. 12, 13, 14, 15 and 16 show various arrangements of optical systems which I may employ.

The gyro-rotor casing 1 is suspended on a vertical trunnion axis 2 in the gimbal ring 3, which is suspended on the horizontal trunnion axis 4 in the outer casing 5 of the instrument. I preferably arrange the gyro to be in neutral equilibrium on the trunnion axis 2 but may give a small gravitational stability to the combination of gyro 1 and gimbal ring 3 about the trunnion axis 4.

The outer casing 5 may be supported on any suitable mounting on the standard director sight but for purposes of illustration it is shown mounted on a vertical axis on the pedestal 6 with a worm 7 gearing in a worm wheel 8 for training the casing in azimuth. The rotor casing 1 carries the two reflectors 9 and 10, the planes of reflection of which are at right angles, are normally vertical and intersect in the axis of the trunnion 2. The objective 11 and eyepiece 12 are fixed to the case symmetrically about the centre line of the gyro in its central position, and the focal plane and the optical centre of the objective are arranged so that they are equidistant from the trunnion axis 4.

The observer sits with his back to the target with his eye to the eyepiece 12 and as the ship rolls or pitches the observer and the outer case 5 move with the ship. The image of the target in the focal plane remains steady and in the same relative position to the cross wires in spite of the rolling of the ship. The explanation of the steadiness of the image is that when the objective 11 rises and falls the image of the target formed by the objective on the focal plane rises and falls an equal amount, but the cross wires on the focal plane also rise and fall by the same amount as the objective since they and the objective are equidistant from the axis 4. Hence angular motion about axis 4 does not affect the position of the image on the cross wires.

Figure 1:
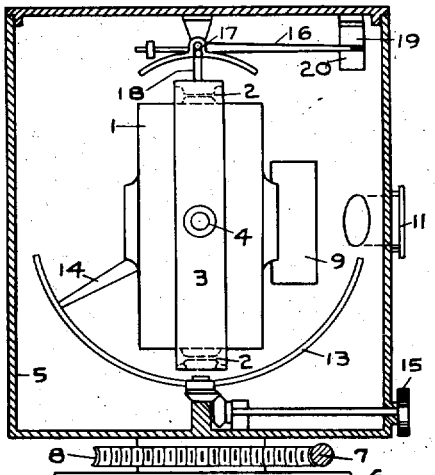

Any angular motion of the casing 5 about the rotor axis in its central position causes the objective to rise and the eyepiece to fall (or vice versa) by equal amounts but it simultaneously inclines the line of intersection of the two mirrors 9 and 10 and the result is that the image of the target remains on the cross wire but becomes slightly inclined to the vertical. Any straying motion of the gyro about the vertical trunnion does not affect the position of the image on the cross wire but straying motion about the horizontal trunnion raises or lowers the image of the target on the cross wire. The gravitational stability about the horizontal trunnion axis 4 is intended to prevent the straying from exceeding a small value. When the gyro strays about the vertical trunnion axis 2 it can be brought back to the central position by means of a torque applied to the end of the trunnion axis 4 which projects through the case 5 and may be furnished with a friction head 4[a] for that purpose. When it strays about the horizontal axis it can be brought back by means of impacts imparted to the rotor casing by turning the four pronged sprocket 13 by means of the knob 15, causing the spokes of the sprocket to engage with the light spring 14 which is attached to the rotor casing. These impulses may be applied to the rotor casing by any other suitable means, electrical or mechanical. The switch for closing the firing circuit consists of a lever 16 which turns on a fulcrum 17 attached to the casing 5 the lever being actuated by a pin 18 attached to the gimbal ring 3 engaging with a slot on the lever, the lever being shown in Fig. 1 in its central position with the pin 18 in the slot. The lever 16 makes contact with one or other of two switch plates 19 and 20, 19 being used for firing on the up roll of the ship and 20 for firing on the down roll, an auxiliary two-way switch serving to throw over from one to the other. The diagram of connections is shown in Fig. 11. The firing key 29 is in series with the two-way switch 29[a] the battery 28 and the gyro switch 16 and if the two-way switch is thrown over to pass the current to contact 19, then, if the firing key be closed at the beginning of the "up" roll, the firing circuit is not closed until the lever 16 moves from the switch plate 20 on to the plate 19.

Figure 3:
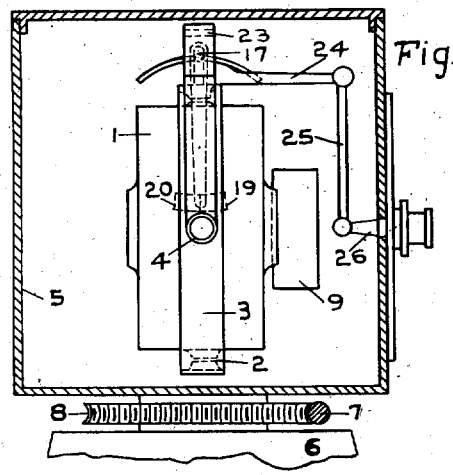
Figs. 3, 4 and 5 show a side elevation, a plan and a front elevation of an alternative arrangement which embodies a method of optical compensation for the tilting of the gyro axis.
Figure 4:
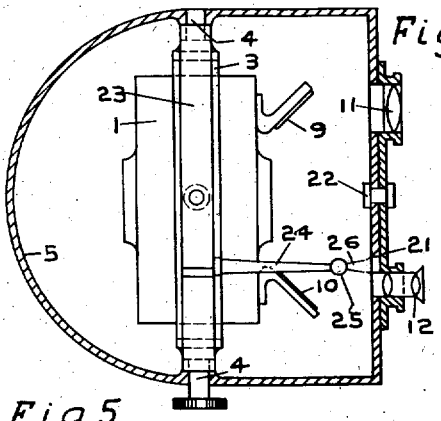
Figure 5:
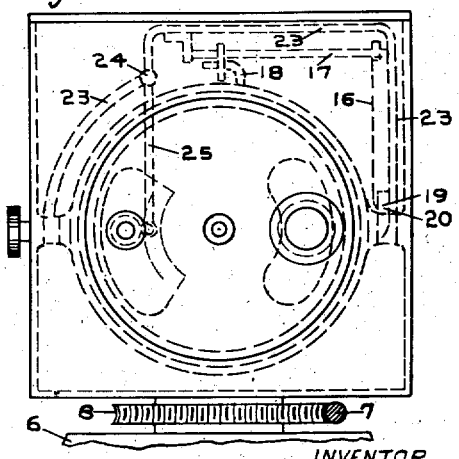
Figure 7:
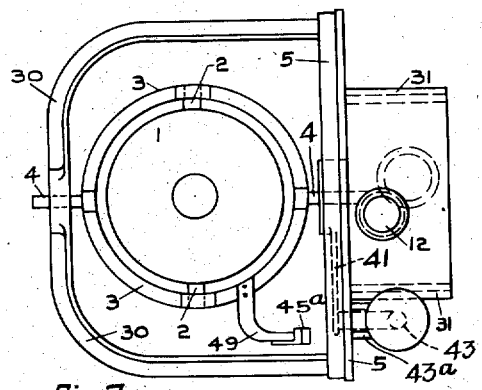

If the rotor axis deviates in azimuth from the central position the image of the target moves up and down by a small amount relatively to the cross wire with each roll and if the greatest accuracy of shooting is aimed at, an alternating precession would have to be introduced to compensate for this motion. This compensation is more accurately done optically as shown in Figs. 3, 4, and 5. The optical compensation consists in mounting the objective 11 and eyepiece 12 on a plate which is pivoted on a pin 22 on the outer casing 5. The same compensation applies to any tilting of the gyro axis about the trunnion 4 and obviates the necessity of introducing a means of precessing the gyro about the horizontal trunnion.

If the gyro axis becomes tilted out of the horizontal plane by rotation about the trunnion 4, the image of the target is raised, let us say, on the cross wires. The superposition of the image again on the cross wires can be brought about by a corresponding lowering of the objective or a raising of the eyepiece or a combination of both. This combination is brought about by turning the plate 21 on the pin 22. The straying of the gyro must not affect the time of closing of the gyro-switch, hence the compensating rotation of the switch plate 21 about the pin 22, must also tilt the switch about the trunnion axis 4 through an angle equal to the angle of tilt of the gyro which has to be compensated. To carry this into effect the gyro switch lever 16 instead of being pivoted on the casing is pivoted on a frame 23 (Figs. 3, 4, and 5) which is mounted pivotally on the trunnion axis 4, the switch plates 19 and 20 being also carried by the frame 23. This frame 23 is turned about the axis 4 by the projecting arm 24 and the connecting rod 25 which connects it with the pin 26 which projects from the plate 21 through a slotted hole in the casing 5. The length of the arm 24 and eccentricity of the pin 26 are so chosen that the tilting of the switch about the trunnion 4 is equal to the tilting of the gyro about the same axis when the optical compensation is complete.

Figure 6:
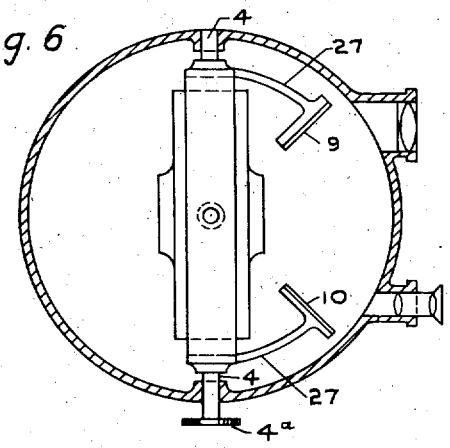
Fig. 6 shows a plan of an alternative arrangement of fixing the reflectors.

Fig. 6 shows an alternative method of mounting the mirrors on the gimbal ring instead of on the gyro case, the mirrors 9 and 10 being attached to the gimbal ring 3 by the two arms 27. Instead of being fixed to the gimbal ring they might equally well be carried on the horizontal trunnion 4, the objective and eyepiece being suitably arranged to correspond.

An objectional feature of the constructions hereinbefore described is that the observer has his back towards the target. Figs. 7, 8, 9 and 10 illustrate respectively a side elevation, a back elevation with the gyro removed, a sectional plan and front elevation of an arrangement of parts which overcomes this objection and which has certain other advantages.

The rotor casing 1 is carried on the vertical trunnion axis 2 in the gimbal ring 3 which is supported on the horizontal trunnion axis 4, at one end on the case 5 and at the other end on the U-shaped bracket 30. The outer case 5 is rigidly attached to the bracket of the elevating telescope of the director sight, by a suitable fixing which is not shown. The objective 11 and eyepiece 12 of the telescope are rigidly attached to the cylindrical sleeve 31 which can turn on the cylindrical projection 32 of the casing 5, suitable apertures being cut in the cylinder 32 to clear the beam of the telescope. The optical centre of the objective and the focal plane are equidistant from the centre of the cylinder but on opposite sides of the centre.

The telescope is of the ordinary type containing four reflectors as in prismatic binoculars. All four reflectors may be attached to the trunnion axis 4 but in the arrangement illustrated only two 33 and 34 (Fig. 9) are attached to the trunnion axis 4 by the crank arm 37, the line of intersection of the two planes of reflection being perpendicular to the trunnion axis. The other two reflectors 35 and 36 (Figs. 9 and 10) are carried by the cranked arm 38 which is pivotally attached to the casing 5 by the pin 39. The line of intersection of the planes of reflection of 35 and 36 is normally coaxial with the trunnion 4. The motion of the cranked arm 38 about the pin 39 is controlled by a pin 40 attached to the arm engaging in a slot in the L shaped lever 41 which turns on a boss 42 on the casing 5 concentric with the trunnion 4. The vertical arm of the L shaped lever is actuated by the screw 43 working in the nut 43ª, which is attached to the casing 5, pressing against the pin 44 which projects from the L shaped lever through a slotted hole in the casing 5. By turning the screw 43 the cranked arm 38 can be raised or lowered about the pin 39 and the two reflectors 35 and 36 are thus raised or lowered.

Figure 8:
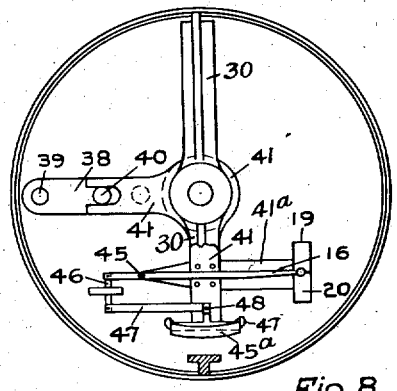

The L shaped lever 41 carries the switch which is shown in Fig. 8. The switch lever 16, which bears on the two switch contacts 19 and 20 mounted on a member 41ª attached to the vertical arm of the L shaped lever 41, is pivotally mounted on the pin 45 carried by the member 41ª and is connected by the link 46 with the escapement lever 47 which is pivotally mounted on the pin 48 carried by the vertical arm of the L shaped lever and is actuated by the trigger 45ª which is attached to the gimbal ring 3 by the projecting arm 49. By virtue of this arrangement a displacement of the switch lever from one contact to the other occurs whenever the ship passes through a predetermined firing position during its angular movement. At all other times the switch lever will be locked against movement toward the contact which it must engage to close the firing circuit, by the engagement of one or the other of the pallets of the escapement with the upper edge of the trigger. The rate of relative movement between the switch lever and the contacts will be magnified with respect to that between the gyroscope and the ship, thus still further increasing the precision with which the guns may be fired.

The image of the target can be elevated or depressed in the field of view by turning the screw 43. The image remains stationary on the cross wires so long as the gyro does not precess about the horizontal trunnion 4. When the ship rolls so much that the beam from the target after passing through the objective misses the reflectors altogether so that the field of view is dark, the image of the target can easily be brought into the field again by turning the cylindrical sleeve 31 carrying the objective and eyepiece on the cylindrical projection 32 of the casing 5, in opposite phase to the roll so as to keep the line joining the objective and eyepiece roughly horizontal. A quick motion once during each roll is equally effective.

The ratio of the distance of the pin 40 from the trunnion axis 4 and from the pin 39 is so arranged that when optical compensation is applied by the screw 43 to compensate for any precession of the gyro about the trunnion axis 4, the L shaped lever 41 carrying the switch, is turned round the trunnion axis 4 through an angle equal to the angle through which the gyro has precessed.

In the foregoing the gyro has been described with its rotor axis horizontal but it can equally well be employed with its rotor axis vertical, in which case the trunnion axis 2 becomes horizontal and the trunnion axis 4 remains horizontal as illustrated. The other parts remain as illustrated except the trigger 45ª which would be attached to the side of the gimbal ring in a convenient position to maintain the position relatively to the switch which is illustrated.

Figure 9:
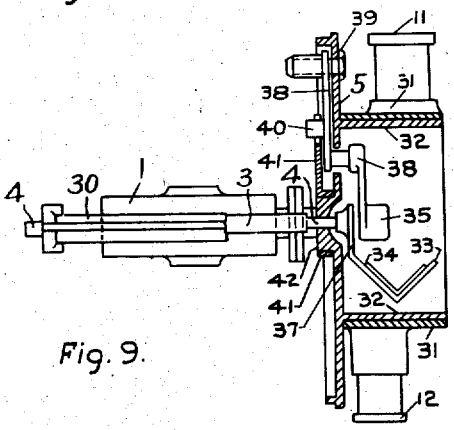
Figure 10:
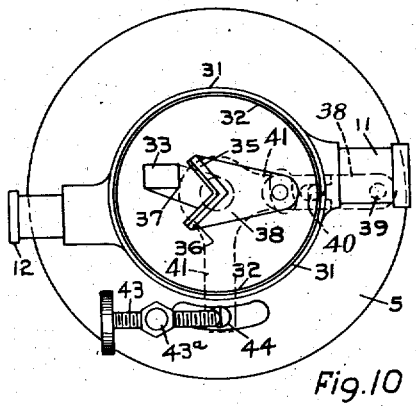

The arrangement of the reflectors illustrated in Fig. 9 is not the only one which I may use; for example, I may doubly reflect the beam after passing through the objective first in the horizontal plane and next in the vertical plane but the combination of reflectors with the vertical edge between them must necessarily be stabilized by the gyroscope.

Many other optical methods of compensating for the tilting of the gyro about the horizontal trunnion 4 are practicable. For instance I may stabilize all four reflectors by attaching them to the trunnion axis 4 and compensate by moving a deflecting prism along the line of collimation of the telescope, or by tilting a thick piece of glass interposed in the beam or by moving the objective relatively to the eyepiece round the trunnion 4 or by any other suitable optical device. In each case the linkage with the switch must be such that the motion required to compensate moves the switch round the trunnion 4 through an angle equal to the tilt of the gyro about axis 4.

The apparatus has been described above in connection with the elimination of the effects of rolling of a ship but it can equally be applied to the yaw or motion in azimuth.

Figure 2:
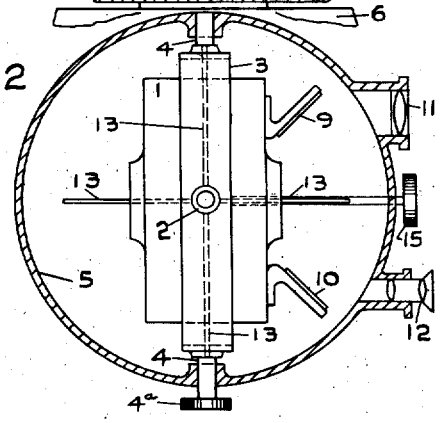
Figure 13:
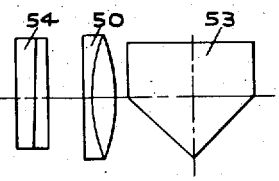

The optical system illustrated in Figs. 2, 6, and 9 are not the only ones I may use. In general, I may use any telescope system which gives an upright image, the inverting portion of the system being stabilized by the gyro and the various dimensions of the system being chosen so that the image remains stationary on the cross-wires. For example, I may employ a system like that illustrated in Figs. 12 and 13. The objective 50 and the eyepiece lenses 51 and 52 are attached to the telescope ring as in Fig. 9. The prism 53, a side elevation of which is illustrated in Fig. 13, is stabilized by the gyro. The traveling achromatic prism 54 serves to keep the object on the cross-wires when the gyro-axis tilts, the translation of the prism 54 parallel to the axis of the telescope being linked up to the switch-plate by suitable mechanical linkage.

Figure 14:
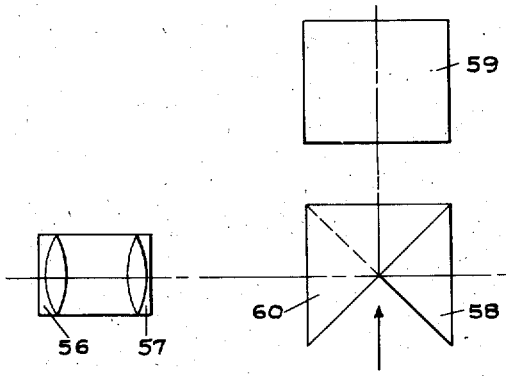
Figure 15:
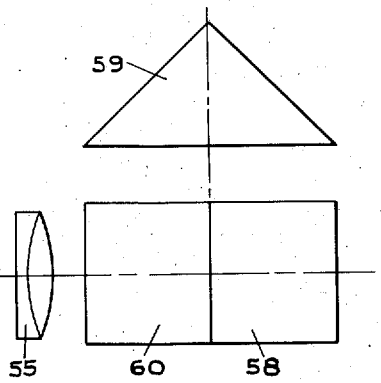

Figs. 14 and 15 show two elevations of another arrangement I may employ. The objective 55, the eyepiece 56—57 and the right-angled prism 58—59 move with the ship, while the right-angled prism 60 is stabilized by the gyro. In order to compensate for the tilting of the gyro-axis I may translate the prisms 58 and 59 and link this translation with the angular motion of the switch-plate by suitable linkage similar to that illustrated in Fig. 9.

Figure 16:
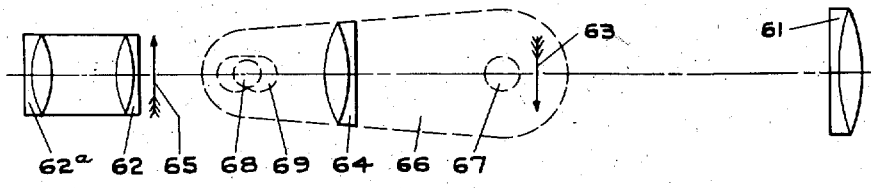

Fig. 16 shows an arrangement I may employ which contains no prisms or reflecting surfaces. The objective 61 and the eyepiece 62—62[a] move with the ship. The focal plane of 61 is at 63 and the inverting lens or system of lenses 64, which is stabilized by the gyro forms an upright image in the second focal plane 65. In order to compensate for the tilting of the gyro-axis I may translate the inverting lens system 64 up and down by the same mechanism which moves the switch-plate. For example, I may attach the lens 64 to a crank 66 which normally turns about a crank-pin 67 coaxial with the gyro trunnion. This crank is stabilized by the gyro by means of a pin 68 carried by the gyro-trunnion engaging in a slot 69 in the crank 66. The crank-pin 67 is linked to the switch-plate by a suitable linkage, for example, the pin 67 might be attached to the lever 38 in Fig. 9, and the ratios of the links are adjusted so that when the lens 64 is moved so as to keep the image on the cross-wires the switch-plate is turned through the same angle as the gyro has tilted. This arrangement of levers might be applied to the prism 53 in Fig. 12 to move it up and down and thus to obviate the necessity of using the prism 54.

In general I arrange an electric contact mechanism preferably between the outer casing and the gimbal ring. This mechanism may take form of a brush attached to the gimbal ring bearing on a contact attached to the outer casing. I prefer, however, to mount both members of the switch on the outer casing and actuate it by a cam or trigger gear attached to the gimbal ring. The velocity ratio of the cam or trigger gear is arranged so that it has its maximum value at the instant when contact is made.

In order to keep the contact in a constant position relatively to the horizontal plane, I arrange a telescope or parts of a telescope on the rotor casing of the gyroscope and I keep the telescope sighted on the horizon at some point near the target to be fired at, the horizontal wire of the telescope being kept in coincidence with the horizon by applying couples to the casing.

I may arrange the whole telescope, preferably of the prismatic type, to be mounted on the rotor casing, but it is evident that while the ship is rolling and the observer is looking through the eyepiece of a telescope, which is maintaining a constant direction in space, he could not fail to apply forces to the eyepiece and thereby alter the setting of the telescope.

I overcome this difficulty in one or other of two ways. I may leave all parts of the telescope connected to the rotor casing except the eyepiece, which I attach to the outer casing and I arrange the parts so that the centre of the focal plane of the telescope is virtually the intersection of the gimbal axes. The observer is then looking through an eyepiece which moves with the ship at an image of the horizon which appears stationary in the field of view.

An alternative method which I may adopt is to fix both the objective and the eyepiece of the telescope to the outer casing and fix only the mirrors of the telescope to the rotor casing. For example, I may fix the objective and the eyepiece side by side on the outer casing so that the observer stands with his back to the target, and I fix to the rotor casing two mirrors say at 90 degrees to each other, and making normally 45 degrees with the line of collimation, the line of intersection of the two mirrors coinciding with the vertical gimbal axis. The eyepiece may be placed at any suitable angle or position by further reflectors attached to the outer casing. The observer on looking through the telescope, sees the horizon stationary on the cross-wires irrespective of the amplitude of the motion of the ship. If the ship is simultaneously pitching and rolling when the telescope is trained on the beam, the horizon appears to tilt relatively to the horizontal wire, through an angle equal to the angle of pitching, but as this tilting takes place about the axis of collimation, it does not mislead the observer if he watches the point of intersection of the horizon with the horizontal wire and keeps it in the centre of the field.

In order to produce the required precession of the gyroscope about the gimbal axis, I arrange two little cranks or handles on the outer casing, the turning of which turn two light flails of spring steel, which being caught by stops in their revolution are later released and impart standard impacts to the rotor casing. Or, I may employ the mutual attraction or repulsion between two coils or between coils and magnets, one coil of each pair being fixed to the gimbal ring and the other to the rotor casing, the coils being energized by currents controlled by switches outside the outer casing. Or, I may employ simple bell crank mechanisms actuating flexible levers inside the outer casing which are brought to bear on the rotor casing or on the gimbal ring. I preferably arrange the handle of the bell-crank mechanism so that the precession takes place in the direction of the motion of the handle.

In order to deal with the yawing motion of the ship I may fit another switch to the same gyroscope, between the rotor casing and the gimbal ring so as to be operated by the motion of the gyroscope about the vertical gimbal axis. But I preferably employ two gyroscopic sighting telescopes and two observers, one of whom has to keep his horizontal cross wire on the horizon near the target ship and the other has to keep his vertical cross wire on the target ship. The whole apparatus may simply be duplicated, the horizontal trunnion axis in the one instrument being turned into the vertical direction in the other.

I arrange the angle of contact in the switch which controls the yawing to be greater than that in the switch which controls the rolling motion, and by means of a relay I may arrange so that the gun will not fire unless the yawing contact is already made when the rolling contact is first made. I may interconnect the two relays so that should the rolling contact be made before the yawing contact relay becomes locked and cannot be closed.

Having now particularly described and ascertained the nature of my said invention and in what manner the same is to be performed, I declare that what I claim is:—

1. In fire-control apparatus for a gun mounted on an angularly moving platform, the combination of a gyroscope, a switch adapted to be controlled thereby, and means associated with the switch for correcting for the effect of straying of the gyroscope thereon.

2. In fire-control apparatus for a gun mounted on an angularly moving platform, the combination of a gyroscope, a switch adapted to be controlled thereby, optical means for detecting straying of the gyroscope, and means associated with the switch for correcting for the effect of such deviation.

3. In fire-control apparatus for a gun mounted on an angularly moving platform, the combination of a gyroscope, a switch adapted to be controlled thereby and comprising a movable contact and a fixed contact, a member movably mounted with respect to the gyroscope and carrying the fixed contact, and means for moving the member to change the relation between the movable contact and the fixed contact in accordance with deviations of the gyroscope.

4. In fire-control apparatus for a gun mounted on an angularly moving platform, the combination of a gyroscope, an optical sighting system having some of its elements mounted on the gyroscope, means whereby the other elements may be moved to compensate for movement of the first named elements caused by deviation of the gyroscope, a firing switch adapted to be controlled by the gyroscope and means operatively connected to the first named means for correcting for the effect of such deviation upon the time of firing of the gun.

5. In fire-control apparatus for a gun mounted on an angularly moving platform, the combination of a gyroscope, an optical sighting system having some of its elements mounted on the gyroscope, means whereby the other elements may be moved to compensate for movement of the first named elements caused by deviation of the gyroscope, a switch for controlling the firing circuit and having a contact operatively connected to the gyroscope, a member movably mounted with respect to the gyroscope and carrying a switch contact adapted to cooperate with the movable contact, and means connecting the member to the means for moving the elements of the optical system, whereby the relation between the contacts may be changed to compensate for the effect of deviation of the gyroscope upon the time of firing of the gun.

6. In fire-control apparatus for a gun mounted on an angularly moving platform, the combination of a gyroscope, an outer casing therefor, an optical sighting system having some of its elements mounted on the gyroscope, a member movably mounted on the casing and carrying other optical parts, a switch for controlling the firing circuit comprising a contact adapted to be moved by relative movement between the gyroscope and the casing, a member movably mounted with respect to the gyroscope, a switch contact carried on the member and cooperating with the first named contact, and connections between the last named member and the member which carries the other optical parts whereby the said parts and the switch contact may be simultaneously moved to compensate for the effect of straying of the gyroscope thereon.

7. In fire-control apparatus for a gun mounted on an angularly moving platform, the combination of a gyroscope, a switch adapted to be controlled thereby, an optical sighting system associated with the gyroscope, and means operatively related to the switch and the sighting system for compensating for the effect of deviations of the gyroscope on the same.

8. In fire-control apparatus for a gun mounted on an angularly moving platform, the combination of a gyroscope, an outer casing therefor, a switch for controlling the firing circuit including a contact adapted to be moved by relative movement between the gyroscope and the casing, a frame movably mounted with respect to the gyroscope, a switch contact carried on the frame and cooperating with the first named contact, and means for moving the frame to compensate for the effect of straying of the gyroscope upon the relation between the contacts of the switch.

9. In fire-control apparatus for a gun mounted on an angularly moving platform, the combination of a gyroscope, an outer casing therefor, a switch for controlling the firing circuit including a contact adapted to be moved by relative movement between the gyroscope and the casing, a frame pivotally mounted upon one of the supporting axes of the gyroscope, a switch contact carried on the frame, and means for swinging the frame in accordance with straying of the gyroscope to compensate for the effect of such straying upon the contacts of the switch.

10. In a director firing system for a gun mounted on an angularly moving platform, the combination of a switch for controlling the firing circuit, gyroscopic means for stabilizing the action of the switch, and means for adjusting the switch to compensate for straying of the gyroscopic means.

11. In a director firing system for a gun mounted on an angularly moving platform, the combination of a switch for controlling the firing circuit, optical sighting means, gyroscopic means for stabilizing the action of the switch and the sighting means, and means for adjusting the switch and the sighting means, to compensate for straying of the gyroscope means.

12. In fire-control apparatus for use on an angularly moving body, controlling mechanism comprising relatively fixed and movable elements, a stabilizing device free from forced oscillations in phase with the disturbing forces introduced by oscillations of the body and actuating means brought into action by the relative movement between the device and the body when the latter passes through a predetermined position during its angular movement for causing relative movement between the elements, said means being locked against movement at all other times.

13. In fire-control apparatus for use on an angularly moving body, controlling mechanism comprising relatively movable elements, a stabilizing device free from forced oscillations in phase with the disturbing forces introduced by oscillations of the body and means brought into action by the relative movement between the device and the body for causing a momentary relative movement between the elements at an increased speed as compared with that between the device and the body.

14. In fire-control apparatus for use on an angularly moving body, controlling mechanism comprising relatively movable elements, a stabilizing device free from forced oscillations in phase with the disturbing forces introduced by oscillations of the body and means brought into action by the relative movement between the device and the body when the latter passes through a predetermined position during its angular movement for causing relative movement between the elements at increased speed as compared with that between the device and the body.

15. In fire-control apparatus for use on an angularly moving body, controlling mechanism comprising relatively movable elements, a stabilizing device free from forced oscillations in phase with the disturbing forces introduced by oscillations of the body, means for normally preventing such movement and adapted to be brought into action by the relative movement between the device and the body when the latter passes through a predetermined position during its angular movement for releasing said preventing means and causing relative movement between the elements and means whereby said mechanism may be adjusted in accordance with the position of the body at which it is desired that actuation of the elements shall occur.

16. In fire-control apparatus for use on an angularly moving body, controlling mechanism comprising relatively fixed and movable elements, a gyroscope and actuating means brought into action by the relative movement between the gyroscope and the body when the latter passes through a predetermined position during its angular movement for actuating said movable elements, said means containing means for preventing such movement in any other position.

17. In fire-control apparatus for use on an angularly moving body, controlling mechanism comprising relatively movable elements, a gyroscope and escapement means brought into action by the relative movement between the gyroscope and the body for causing relative movement between the elements at an increased speed.

18. In fire-control apparatus for use on an angularly moving body, controlling mechanism comprising normally locked relatively movable elements, a gyroscope and means brought into action by the relative movement between the gyroscope and the body when the latter passes through a predetermined position during its angular movement for causing relative movement between the elements at an increased speed.

19. In fire-control apparatus for use on an angularly moving body, controlling mechanism comprising normally locked relatively movable elements, a gyroscope, means brought into action by the relative movement between the gyroscope and the body when the latter passes through a predetermined position during its angular movement for causing relative movement between the elements and means whereby said mechanism may be adjusted in accordance with the position of the body at which it is desired that actuation of the elements shall occur.

20. In fire-control apparatus for use on an angularly moving body, controlling mechanism comprising relatively movable elements, a stabilizing device free from forced oscillations in phase with the disturbing forces introduced by oscillations of the body and an escapement mechanism having a part associated with the device and a part associated with one of the elements for causing relative movement between the elements when the body passes through a predetermined position during its angular movement.

21. Circuit controlling mechanism for use on an angularly moving body comprising relatively movable switch elements, a stabilizing device free from forced oscillations in phase with the disturbing forces introduced by the oscillations of the body and means brought into action only by the relative movement between the device and the body when the latter passes through a predetermined position during its angular movement for causing relative movement between the elements which are locked together at all other times.

22. Circuit controlling mechanism for use on an angularly moving body comprising relatively movable switch elements, a stabilizing device free from forced oscillations in phase with the disturbing forces introduced by the oscillations of the body and escapement means brought into action by the relative movement between the device and the body for causing relative movement between the elements at an increased speed.

23. Circuit controlling mechanism for use on an angularly moving body comprising relatively movable switch elements, a stabilizing device free from forced oscillations in phase with the disturbing forces introduced by the oscillations of the body and actuating means brought into action by the relative movement between the device and the body only when the latter passes through a predetermined position during its angular movement for causing relative movement between the elements at an increased speed, said elements being locked together during all other positions of the body.

24. In fire-control apparatus for use on an angularly moving body, controlling mechanism comprising relatively movable elements, a stabilizing device free from forced oscillations in phase with the disturbing forces introduced by oscillations of the body, means brought into action by the relative movement between the device and the body when the latter passes through a predetermined position during its angular movement for causing relative movement between the elements and means including optical elements whereby said mechanism may be adjusted in accordance with the position of the body at which it is desired that actuation of the elements of the controlling mechanism shall occur.

25. In fire-control apparatus for use on an angularly moving body, controlling mechanism having relatively movable elements, an optical instrument having an element adapted to partake of the angular movement of the body and a second element mounted to move relatively to the first element, a stabilizing device free from forced oscillations in phase with the disturbing forces introduced by the oscillations of the body, connections between the device and the second optical element for moving it relatively to the body to compensate for the effect of the angular movement of the body on the image of a distant object in the field of view of the instrument and means brought into action by the relative movement between the device and the body when the latter passes through a predetermined position during its angular movement for causing relative movement between the elements of the controlling mechanism.

26. In fire-control apparatus for use on an angularly moving body, firing mechanism and an optical instrument each having an element adapted to partake of the angular movement of the body, a second element of the mechanism mounted to move relatively to the first element thereof, a second optical element mounted to move relatively to the body, a gyroscope, connections between the gyroscope and the second optical element for moving it relatively to the body to compensate for the effect of the angular movement of the body on the image of a distant object in the field of view of the instrument and means brought into action by the relative movement between the gyroscope and the body when the latter passes through a predetermined position during its angular movement for causing relative movement between the elements of the firing mechanism.

27. In fire-control apparatus for use on an angularly moving body, an optical instrument for viewing distant objects, means for eliminating relative movement between the image of a distant object and a reference mark in the field of view of the instrument, controlling mechanism comprising relatively movable elements and means under the control of the eliminating means for determining the point of actuation of the elements of the mechanism.

28. In fire-control apparatus for use on an angularly moving body, an optical instrument for viewing distant objects, means including a gyroscopically controlled element for eliminating relative movement between the image of a distant object and a reference mark in the field of view of the instrument, controlling mechanism comprising relatively movable elements and means under the control of the eliminating means for determining the point of actuation of the elements of the mechanism.

In testimony whereof I affix my signature.

JAMES BLACKLOCK HENDERSON.